United States Patent [19]

Tulk

[11] Patent Number: 4,473,877

[45] Date of Patent: Sep. 25, 1984

[54] PARASITIC MEMORY EXPANSION FOR COMPUTERS

[76] Inventor: Ronald K. Tulk, 3595 E. Exposition, Denver, Colo. 80209

[21] Appl. No.: 254,889

[22] Filed: Apr. 16, 1981

[51] Int. Cl.³ .............................................. G06F 13/00
[52] U.S. Cl. .................................................. 364/200
[58] Field of Search ........................................ 365/200; 364/200 MS File, 900 MS File

[56] References Cited

U.S. PATENT DOCUMENTS

| | | | |
|---|---|---|---|
| 3,292,151 | 12/1966 | Barnes et al. | 364/200 |
| 3,967,251 | 6/1976 | Levine | 364/200 |
| 3,972,025 | 7/1976 | Taddei | 364/200 |
| 4,025,903 | 5/1977 | Kaufman et al. | 364/200 |
| 4,028,675 | 6/1977 | Frankenberg | 364/900 |
| 4,093,982 | 6/1978 | Heuer et al. | 364/200 |
| 4,158,227 | 6/1979 | Baxter | 364/200 |
| 4,164,786 | 8/1979 | Gollomp | 364/200 |
| 4,200,919 | 4/1980 | Page et al. | 365/189 |
| 4,340,932 | 7/1982 | Bakula et al. | 364/200 |
| 4,393,443 | 7/1983 | Lewis | 364/200 |

*Primary Examiner*—Gareth D. Shaw
*Assistant Examiner*—Daniel K. Dorsey
*Attorney, Agent, or Firm*—John E. Reilly

[57] ABSTRACT

A memory expansion circuit for expanding computer memory capacity requiring a minimum of alterations to the host system is disclosed. The memory expansion circuit is parasitic in that it fully exploits address lines, data input and output lines, and control lines already available in the existing host computer system, and it is suitable for use with both static and dynamic memory devices. In a preferred embodiment, a bank of memory devices which responds to a single memory read or write operation in the host computer system is removed, and the parasitic memory circuit containing a number of banks of memory devices is inserted in its place thereby providing a software-selectable number of memory banks to replace the one removed. The method is particularly adaptable for use with contemporary 8-bit microprocessors and especially to systems which are not built around a buss architecture.

11 Claims, 5 Drawing Figures

PARASITIC MEMORY EXPANSION FOR COMPUTERS

The present invention relates generally to electronic memory expansion circuits, and to a method and apparatus for implementing parasitic memory expansion in a digital computer whereby a minimum amount of additional electronic hardware and software alterations of the host computer is required. Specifically, the invention relates to an expansion circuit for replacing a single structured byte of memory devices in a host system in such a way that the expansion circuit is made fully operational using the pre-existing address lines, data lines, and control lines with only minor modifications to the host system software.

BACKGROUND AND FIELD OF THE INVENTION

Devices and methods for expanding the memory capacity in digital computers are, of course, well-known in the computer art. Known techniques for accomplishing memory expansion range from the "over-capacity" approach at one extreme to "brute force" approaches at the other. In the typical over-capacity approach both software and hardware expansion provisions are made in advance, and the expansion devices are merely inserted at some later time into the host system if and when needed. The brute force, or ad hoc approaches, include schemes where memory expansion devices are added by conventional hard wiring in the expansion memory circuits, and inserting adjunct circuitry including code and level converters, control logic conversions, and the inevitable additional power supplies.

To a considerable degree, the approach used depends on the configuration of the host system which is to be expanded, and on the degree of retrofit complexity that can be tolerated. Prior art approaches have tended to be based on static memory devices, and on the assumption that retrofit modifications are tolerable. The present invention is a significant departure from these approaches and can work with both static and dynamic memory devices, but is especially advantageous when using dynamic memory expansion. Dynamic memory expansion is denser, more cost effective, and less power consumptive than static memory. However, by its nature, dynamic memory requires considerably more electronic overhead, such as, for refresh operations and address multiplexing than static memory, and the implementation of this electronic overhead can be very complex and demanding. Employing the new method of dynamic memory expansion in accordance with the present invention eliminates the need for the design and implementation of such electronic overhead, thus allowing a simple and economically very attractive method of expansion with a minimum of modifications to the existing host computer system.

Illustrative prior art patents which teach a variety of computer memory expansion approaches are found in U.S. Pat. No. 3,972,025 to Taddei, U.S. Pat. No. 3,967,251 to Levine, and U.S. Pat. No. 3,292,151 to Barnes et al.

SUMMARY OF THE INVENTION

It is therefore a primary object of the present invention to provide improved methods and apparatus for implementing memory expansion of digital computers.

A further object of the present invention is to provide a simple and efficient method of expanding computer memory requiring a minimum of additional electronic hardware and software modifications to the host computer system.

Another object of the present invention is to provide a method of expanding computer memory which is particularly amenable to existing 8-bit microprocessors and especially to those microcomputer systems which are not built around a buss architecture.

A further object of the present invention is to provide for a parasitic circuit for expanding computer memory wherein everything needed to implement the memory expansion, such as address lines, data lines, and control signals, is taken directly from the host computer system.

A still further object of the present invention is to provide a parasitic circuit for expanding computer memory which is conformable for use both with static and dynamic memory technologies and particularly those which already have a full memory complement and are not designed for memory expansion.

The objects and advantages of this invention are realized in the preferred form by removing a bank of memory chips comprising a structured byte, or equivalent structured bit organizational unit in the host computer system which responds to a single memory read or write operation, and inserting in its place a plurality of banks of memory devices wired in parallel which continuously retain stored data with one bank at a time capable of responding to a read/write operation using the host computer output and control signals so as to expand substantially the host computer memory system. In order to be able to determine efficiently which bank is to be operational, a host computer output signal or equivalent is tapped by a single wire. The OUT signal, along with the buffered address lines, can be decoded so that the memory expansion circuit board itself can recognize when it is being addressed. When the memory expansion circuit board is being addressed through an output command from the host computer, the data output by the host computer on some or all of the data lines may be stored in simple latches. This stored data is input to a decoding scheme that activates one line, at most, that corresponds to one memory bank. For positive logic, the logical AND of the buffered device enable line and the activated bank select line is used to control read and write operations on, at most, one bank of memory.

In one embodiment, input/output mapping can be employed in selecting one of several memory expansion banks and combines a buffered input/output line with address lines as an input to an input/output device decoder. The device decoder can be one of any of several commercially available components such that the output from the device decoder becomes active if the input/output line is active and the address lines represent the proper binary number for the memory expansion circuit.

In another embodiment of the present invention, memory expansion bank selection may be carried out by memory mapping which applies only the address lines for the input/output device designation without the assistance of a buffered input/output line as required in the input/output mapping system. For instance, this can be achieved by utilizing the last byte of the host computer memory bank address base as a "signal address" to be used in designating the desired expansion memory bank.

The above and other objects, advantages and features of the present invention will become more readily appreciated and understood from the foregoing detailed description of a preferred embodiment when taken together with the accompanying drawings, in which:

DETAILED DESCRIPTION OF THE PREFERRED EMBODIMENT

Figure 1:
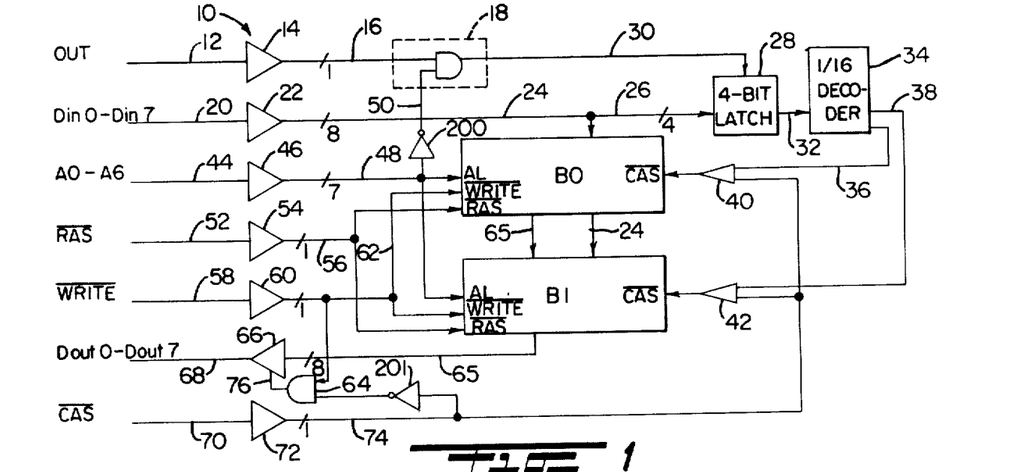
FIG. 1 is a logic diagram of an I/O mapped bank selection embodiment of the parasitic memory expansion system for expansion of a host computer having dynamic memory according to the present invention.
Figure 2:
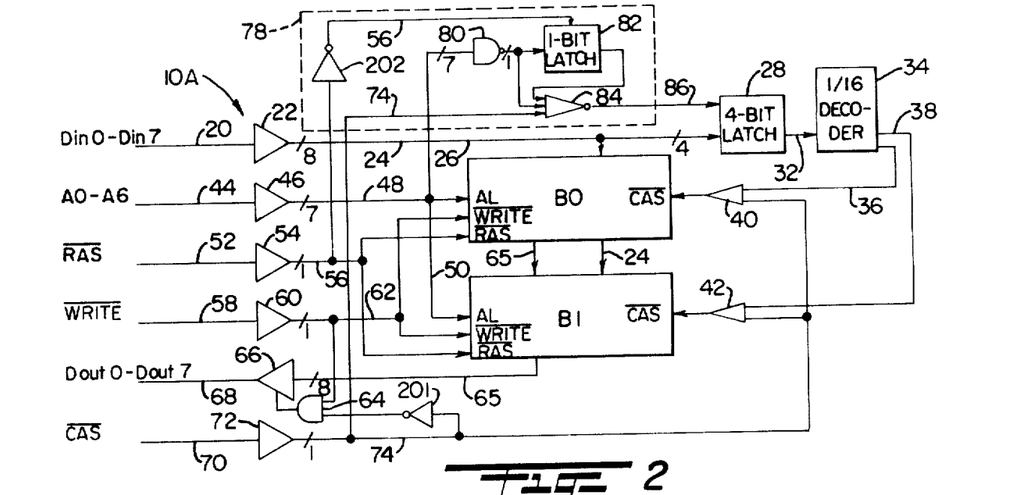
FIG. 2 is a logic diagram of a totally parasitic embodiment of the parasitic memory expansion system using memory mapped memory bank designation for expansion of a host computer having dynamic memory according to the present invention.

Referring now to FIGS. 1 and 2, there are shown simplified logic diagrams of two embodiments of the parasitic memory expansion circuit in accordance with the method and apparatus of the present invention. Generally, each of the memory expansion circuits of FIGS. 1 and 2 is configured to provide the desired memory expansion for a host computer having dynamic memory banks by being inserted into sockets vacated by removing one bank or byte of memory devices from the host computer. The socket pins of the bank in the host system so vacated are sufficient to provide all of the input/output, address, power and control lines needed to accommodate the inserted memory expansion circuit. The address lines, data input lines, data output lines, control lines, and power supply lines which supported the removed bank are made available to the memory expansion circuit by use of jumper cables which mate with the emptied sockets. Additionally, the memory expansion circuits may contain a large number of additional memory device banks, such as, two, ten or more, being limited largely by software instruction capabilities or power supply considerations of the host computer system.

As will be hereinafter discussed, the embodiment of FIG. 1 is designated "I/O mapped bank selection" and requires one more control line from its host computer than would be available via the pins of the removed bank of memory devices. This extra control line, or I/O strobe, provides a signal to indicate when the address buss of the host computer is being used to indicate an I/O port address instead of a memory address. This port address will be used to indicate which memory bank in the memory expansion circuit of the present invention is to be selected.

The embodiment of FIG. 2 is designated as "memory mapped bank selection" and requires no additional connections to the host computer beyond those available on the vacated pin sockets. It is of significant value in candidate computer systems wherein the I/O strobe signal is non-existent, or inaccessible. In both embodiments, the address, data, and control lines including the I/O strobe are buffered to insure that they have sufficient output capabilities to drive all of the components of the memory expansion circuit into which they are loaded. The embodiments of FIG. 1 and FIG. 2 will be described only to impart an understanding of the basic memory expansion involved for a host computer containing dynamic memory chips, and will be amplified by description of the embodiment of FIG. 4 and its detailed logic description for the ten bank embodiment disclosed therein.

Figure 4A:
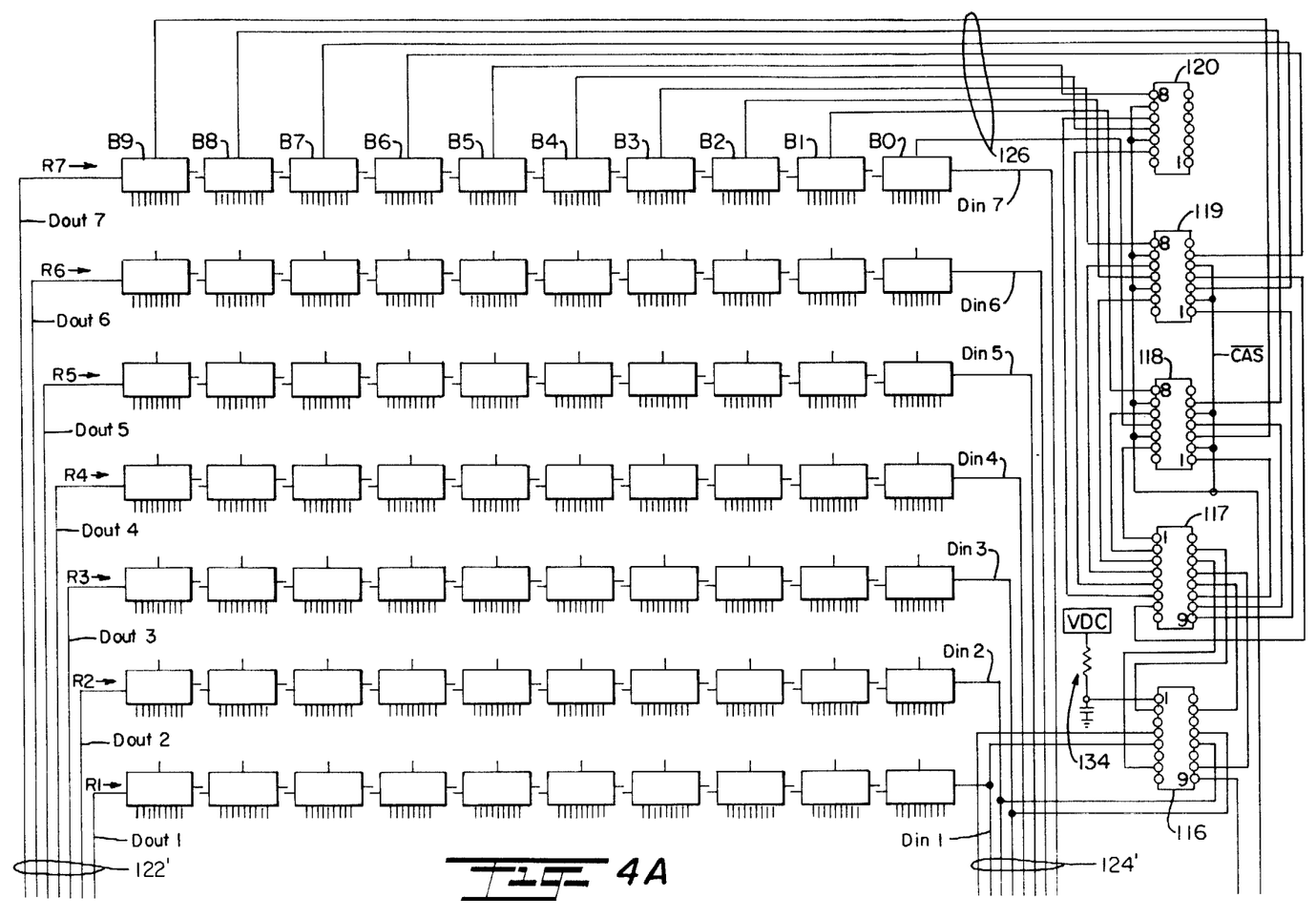
FIGS. 4A and 4B is a detailed block diagram of a preferred form of parasitic memory expansion circuit according to the present invention.
Figure 4B:
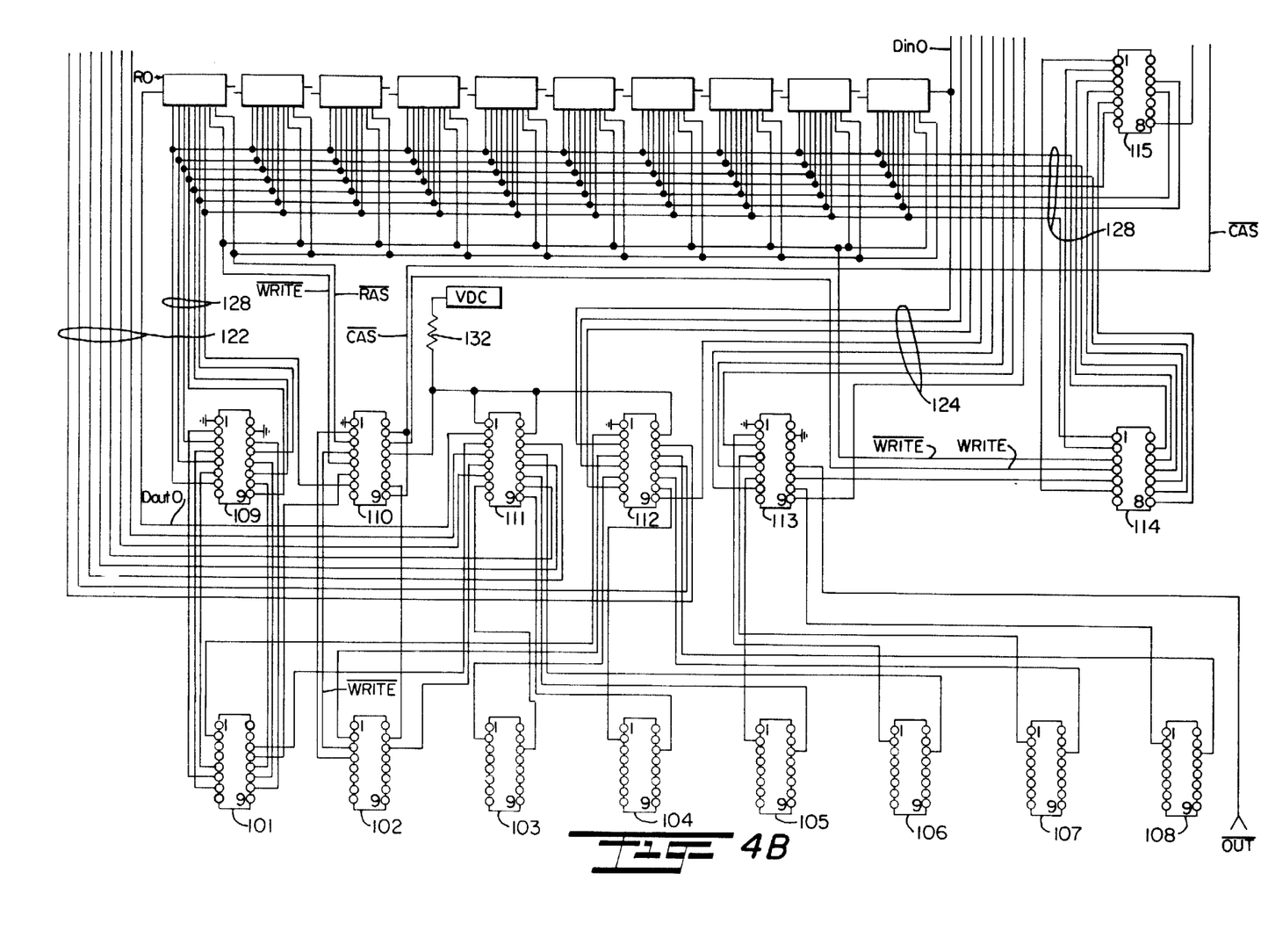

With reference now to FIG. 1, a parasitic memory expansion circuit 10 is shown as including an OUT signal or I/O strobe from the host computer via line 12 to a buffer device 14. The buffer 14 may be of the type contained in commercial devices designated as 3-state hex buffer 74SN367, as summarized in Table 2 below. As indicated above, a detailed description of the particular logic devices and functions will be provided in connection with the embodiment of FIG. 4. For present purposes, brief reference to the logic elements of Table 2 is sufficient to determine the particular active circuit elements contemplated. The buffered OUT signal is routed via line 16 to a first input of an N-input AND gate 18. Eight data input lines Din0–Din7 are applied via a corresponding number of lines 20 and are individually applied to a corresponding number of eight input data buffers 22, a single line 20 and buffer 22 being illustrated. The individual outputs from the buffers 22 are applied via a line 24 to the individual data lines of a first expansion memory bank $B_o$. Conventionally, the "/8" designation on line 24 designates the eight individual lines present in the group. The group of lines 24 are further routed in parallel from the memory bank $B_o$ to the individual data input lines of a second expansion memory bank B1. A lesser number of outputs as designated at "/4" from the buffers 22 are applied via lines 26 to the inputs of a 4-bit D latch 28. An output from the AND gate 18 is routed via a line 30 to the clock input of 4-bit latch 28 thereby clocking in the data applied to the four D inputs upon the correct translation signal being received from AND gate 18. The four assertion outputs from the 4-bit latch 28 are routed via lines 32 to the inputs of a 4-line-to-16-line decoder 34. This 4-line-to-16-line decoder in this instance is such that only one of the 16 output lines will be active at any one time and only the active output line will have a low voltage (or zero logical state) designation with all other inactive output lines possessing a +1 state. First and second outputs from the decoder, corresponding to the two particular decoded states are routed via lines 36 and 38, respectively, to a pair of OR gates 40 and 42. The output from OR gate 40 is applied to the column address strobe $\overline{CAS}$ input of the memory bank $B_o$, and the output from OR gate 42 is similarly applied to the $\overline{CAS}$ input of the memory bank B1. Here, "$\overline{CAS}$" signifies that the CAS line is active in the low voltage or zero logic state.

Seven input address lines A0–A6 are individually applied over lines 44 to a like number of buffers 46. The outputs from the buffers 46 are applied in parallel over lines 48 to individual address input lines AL of both expansion memory banks $B_0$ and B1. The addresses A0–A6 are modified by inverting some of lines A0–A6 with inverting buffers 200 so as to be able to vary the output port address for recognition by AND gate 18, and are routed via lines 50 to the remaining inputs of the AND gate 18. A row address strobe $\overline{RAS}$ line is applied via a line 52 to a buffer 54, and thereafter via a line 56 to the $\overline{RAS}$ inputs of banks $B_o$ and B1 in parallel. A write command line $\overline{\text{WRITE}}$ is applied via line 58 to a buffer 60, and thereafter via line 62 to the $\overline{\text{WRITE}}$ inputs of banks $B_o$ and B1 in parallel, and further to a first input of an AND gate 64. Eight data output lines Dout-0–Dout7 are routed from memory banks $B_o$ and B1 over lines 65 and are individually applied to a like number of buffers 66, and thereafter are routed via a group of lines 68 to the eight data output lines Dout0–Dout7. A column address strobe $\overline{\text{CAS}}$ line operates as a bank enable line which is applied via a line 70 to a buffer 72, and thereafter via a line 74 to second inputs of the two OR gates 40 and 42 in parallel; and is further applied after being logically inverted by inverting buffer 201 to a second input of the AND gate 64, whose output is applied via a line 76 to an enable input of the buffer 66. Thus, AND gate 64 enables output from the memory devices through buffers 66 to the host computer only when the host is performing a read operation from the memory bank. Of the seven major input and output groups at the left side of the circuit of FIG. 1, the bottom six; namely, the data input lines, address lines, $\overline{\text{RAS}}$, $\overline{\text{WRITE}}$, data output lines, and the $\overline{\text{CAS}}$ are all available from the pins vacated when the bank of dynamic memory devices is removed from the host computer. The memory banks $B_o$ and B1 of the memory expansion circuit 10 are pin-compatible with the removed devices to permit a highly simple interface for the appended expansion memory. The OUT control signal in this case is tied into the host computer system at some readily accessible point so as to result in a parasitic memory expansion capability.

Operationally, an output port software command from the host computer is issued to first select one of the available memory banks $B_o$ or B1 so that conventional read or write operation can be initiated by the host to exploit the increased amount of memory available. Briefly, this is accomplished by an output port software command causing the host computer to enter the port address for the memory expansion bank designation onto lines A0–A6 which are then specifically modified by the appropriate inverting buffers 200 so that the multiple input AND gate 18 can recognize the translated port address. Concurrently, an OUT signal is produced by the host which, in combination with the modified address, is decoded in the AND gate 18. The active output from AND gate 18 is used to clock into the 4-bit latch 28 a particular subset of information provided by the host via the data input lines, which subset of information is decoded by the 1/16 decoder 34 to effectively select one of the two memory banks $B_o$ or B1. One of the two having been selected, the host may thereafter read or write data as required, and has available to it nominally double the memory capacity via banks $B_o$ and B1 as it previously had at that particular address location.

With reference now to FIG. 2, a dynamic memory parasitic memory expansion circuit 10A is shown, wherein elements having like functions to those of FIG. 1 are given like reference designations. Being totally parasitic, the circuit 10A does not require the OUT signal from the host computer and therefore develops a functional equivalent of this by means of decoder circuit 78. FIG. 2 differs from FIG. 1 only in the method employed to select the desired memory bank. Circuit 78 of FIG. 2 demonstrates one application of "memory mapped" bank selection as applied to a memory expansion utilizing typical dynamic memory devices. Dynamic memory devices complicate "memory mapped" bank selection because, as hereinafter explained in the description of FIG. 3, the address (14 bits for a 16K × 1 device) is multiplexed into two sequential addresses (two 7 bit addresses). As a result, the recognition of the "signal address" by the bank select circuitry becomes a two-stage procedure as only one-half of the full address is available at any instant.

Circuit 78 is designed to recognize whenever the last byte in the address space is being accessed by the host computer for a read/write operation. The address for this "signal address" byte would have all address lines for both sequential half-addresses being represented by a logical one state (or +5 volts for TTL logic). This "signal address" is used as an example because the address decode circuitry is simpler than if a more general "signal address" were employed.

The first half of the memory address is placed on lines A0–A6 by the host computer, and the row address strobe $\overline{\text{RAS}}$ indicates when the address is valid. The buffered address lines are input to a 7 input NAND gate 80 via lines 50. Only if all address lines of the first half-address are of a logical one state will the output of gate 80 be a logical zero state. The buffered $\overline{\text{RAS}}$ signal, after being inverted by inverting buffer 202, is input to the clock input of the one bit latch 82, thus storing in latch 82 the output of gate 80 which is the decoded result of the first half-address. This stored result is the first input to a three input NOR gate 84.

Some finite time interval after the row address strobe signal is given, the second half-address is placed on address lines A0–A6 by the host computer, with the column address strobe $\overline{\text{CAS}}$ now being used to indicate when this second half-address is valid. As before, the buffered address is input to NAND gate 80. For the second half-address, the effective output of gate 80 goes to the second input of NOR gate 84. Thus, the second input to gate 84 will be a logical zero if the second half-address is composed of logical ones. The last input to gate 84 is the buffered column address strobe $\overline{\text{CAS}}$; via line 74. When the $\overline{\text{CAS}}$ signal is a logical zero, the output of gate 80 for the second half-address is valid. Only if all three inputs to gate 84 are a logical zero will the output of gate 84 become a logical one to signal the 4 bit latch via line 86 to store certain data on the data lines. All three inputs to gate 84 will be logical zeroes if, and only if, the last byte of the address space; i.e., the "signal address", is being accessed by the host computer in a read/write operation. The information provided by the host via the data input lines, such as, the four data input lines Din0–Din3, serve as before to select which of the two memory banks $B_o$ or B1 is to be made operational upon the four bits being clocked into the 4-bit latch 28, and subsequently being decoded in the 1/16 decoder 34.

As before, the 1/16 decoder 34 performs the selection of which of the two memory banks is to be made operational, and the subsequent read and write operations by the host computer are then carried out using its conventional read and write instructions. Thus it is seen that the desired memory bank selection provides a two-fold memory expansion, and that this has been done with modest software for memory bank selection and completely without the need for modifying the host computer wiring.

Figure 3:
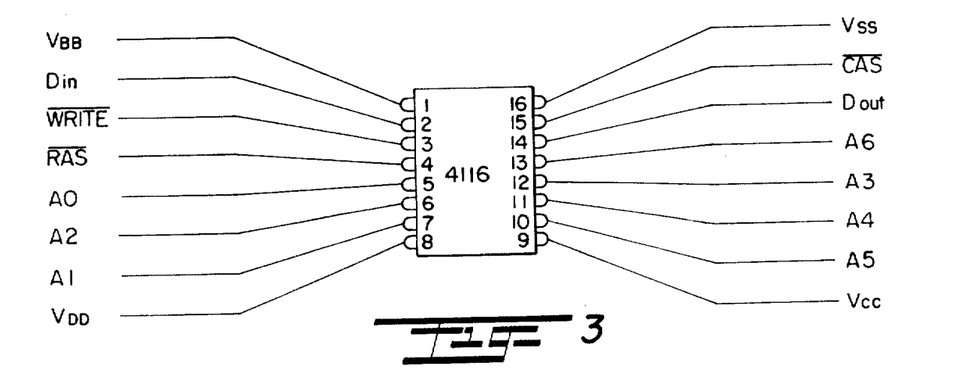
FIG. 3 is a typical pin function assignment diagram of a dynamic memory device suitable for use in parasitic memory expansion circuits as illustrated in FIGS. 1 and 2.

Referring now to FIG. 3, there is shown a pin assignment for a type 4116 dynamic memory device. The 4116 device has 16,384 addresses with a word length of 1. Eight of these memory devices would allow for a memory of 16K by 8, where K = × 1024. While this memory device is well-known in the contemporary computer art, a brief review is useful for present purposes. The storage elements in the memory device are physically organized as 128 address rows by 128 address columns by one bit of word length. By multiplexing row and column address inputs, the memory device requires only seven address lines to access the 16,384 one-bit words. To access a particular bit of information, a row address is first placed on the seven address lines, A0-A6. The $\overline{RAS}$ or row address strobe line at pin 4 is driven low to indicate to the device that a correct row address is present. The row address is then removed from the address lines, and a column address is applied. The $\overline{CAS}$ or column address line at pin 15 is driven low to indicate that a correct column address is present. Upon this latter action, the data stored at the specified address appears on the Dout line at pin 14. In order to change the information at a particular location, the $\overline{WRITE}$ line at pin 3 is driven low. This causes the data present on the Din line at pin 2 to be stored until changed, or until power is lost, or a memory refresh fails to occur. As the 4116 device is dynamic, that is, the actual information is stored in a capacitor whose charge drains away, it is necessary to periodically recharge the capacitor or "refresh" memory. This is a process of reading out what is already in memory and writing it back. Additional specific utilization details on the 4116 device may be obtained from the data sheets for the commercially available unit designated as MCM 4116B.

Referring now to FIGS. 4A and 4B, there is shown a detailed block diagram of a parasitic memory expansion circuit 100 according to the present invention. An array of dynamic random access memory devices is shown as comprised of eighty interconnected memory devices arranged in ten vertical banks, designated banks B0-B9, with each bank being comprised of eight horizontal rows designated R0-R7. Each of the memory devices may be of the type 4116, which are commercially available and designated 16K × 1-bit RAMs. The 4116 devices are as previously described in connection with FIG. 3. As configured, the array of memory devices establish a memory expansion capability of ten banks, each bank having a 16K × 8-bit capacity.

A set of eight I/O sockets 101-108 are used to interconnect the parasitic memory circuit 100, hereinafter the PME circuit 100, to its host computer, and an additional control line designated $\overline{OUT}$, also from the host computer, completes the interconnections needed. The sockets 101-108 are shown as being of the 16 pin DIP type and have their pins 1 and pins 9 marked for reference orientation. In use, the sockets are cable-mounted to a like number of corresponding sockets in the host computer from which the memory devices have been removed, and the $\overline{OUT}$ signal on the $\overline{OUT}$ control line provides needed host computer status. Thus, the PME circuit 100 serves as a one-to-ten memory bank expansion for the host computer, which is interconnected by removing one row of memory devices from the host.

Brief reference to FIG. 3 shows the various signals and voltages applied by the host to the sockets 101-108. With particular reference to socket 101 of FIG. 4, there are seven address lines A0-A6 inputted via the pins as shown in Table 1; a data input line Din for inputting data via pin 2; and a data output line Dout for outputting data via pin 14. Each of the eight sockets 101-108 has individual Din and Dout connections for interfacing data between the host computer and the PME circuit 100. The Din via socket 101 is designated Din0, the Din for socket 102 is designated Din1, and so on, such that the Din for socket 108 is Din7. Thus, Din0-Din7 are the eight inputs for data to the PME circuit 100. In like manner, Dout0-Dout7 are the eight outputs from the PME circuit 100 to the host computer.

TABLE 1

| Designation | Socket 101-108 Connections Function | Pin No. |
|---|---|---|
| A0 | address line | 5 |
| A1 | address line | 7 |
| A2 | address line | 6 |
| A3 | address line | 12 |
| A4 | address line | 11 |
| A5 | address line | 10 |
| A6 | address line | 13 |
| Din | data input | 2 |
| Dout | data output | 14 |
| $\overline{WRITE}$ | write | 3 |
| $\overline{RAS}$ | row address strobe | 4 |
| $\overline{CAS}$ | column address strobe | 15 |

With respect to socket 102, the $\overline{WRITE}$ signal is applied from the host via pin 3; the $\overline{RAS}$ signal is applied from the host via pin 4; and the $\overline{CAS}$ signal is applied from the host via pin 15. The use of the eight sockets/memory devices is illustrative in that the eight-bit byte is commonly encountered in contemporary computer organizations. Clearly, however, the apparatus and method of the present invention is equally applicable to other byte structures.

Twelve additional active circuit elements designated 109-120 are shown as associated with the twelve DIP socket outlines, and serve to actively interconnect the I/O sockets 101-108 plus the $\overline{OUT}$ signal line with the eighty memory devices in banks B0-B9 and rows R0-R7. The twelve circuit elements 109-120 are either fourteen pin or sixteen pin DIP.

TABLE 2

| Circuit Element | PME Active Circuit Elements Description | Device Type | No. of Pins |
|---|---|---|---|
| 109 | 3-state hex bus driver | 74SN367 | 16 |
| 110 | 3-state hex bus driver | 74SN367 | 16 |
| 111 | 3-state hex bus driver | 74SN367 | 16 |
| 112 | 3-state hex bus driver | 74SN367 | 16 |
| 113 | 3-state hex bus driver | 74SN367 | 16 |
| 114 | 3-state hex inverter | 74LS04 | 14 |
| 115 | 8-input NAND gate | 74LS30 | 14 |
| 116 | 4-bit latch | 74LS175 | 16 |
| 117 | 4-line-to-10-line decoder | 74LS42 | 16 |
| 118 | quad 2-input OR gates | 7432 | 14 |
| 119 | quad 2-input OR gates | 7432 | 14 |
| 120 | quad 2-input OR gates | 7432 | 14 |

A group of eight data output lines 122 are shown as having one particular line routed to all of the memory devices in a particular one of the rows R0-R7, and as interconnecting with hex bus drivers 111 and 112. A group of eight data input lines 124 are shown as having one particular line routed to all of the memory devices in a particular one of the rows R0-R7, and as interconnecting with the hex bus drivers 112 and 113. A group of ten bank select lines 126 have one particular line routed to all of the memory devices in a particular one of the banks B0-B9, and interconnect with the OR gates 118, 119, and 120. A group of seven address lines 128 are shown as routing address signals from the hex bus drivers 109 and 110 to all of the eighty memory devices in parallel; and further as routing selected address signals to the hex inverter 114, and as routing selected other address signals to the 8-input NAND gate 115. A write enable signal $\overline{\text{WRITE}}$ signal, and a row address strobe $\overline{\text{RAS}}$ signal are individually routed from the hex bus driver 109 ($\overline{\text{WRITE}}$ from pin 5, $\overline{\text{RAS}}$ from pin 3) to all of the eighty memory devices in parallel. A column address strobe $\overline{\text{CAS}}$ signal is routed from the hex bus driver 110 (pin 9) to a plurality of connections on the OR gates 118, 119 and 120.

To avoid competition between the memory expansion circuit and the host computer for access to the host computers data line bus, output from buffers 111 and 112 for lines Dout 0 through Dout 7 are not enabled unless the host computer is performing a read operation from the memory expansion circuit. The host computer will signal a read operation from the memory expansion circuit when the $\overline{\text{CAS}}$ line is low and the $\overline{\text{WRITE}}$ line is high. The $\overline{\text{CAS}}$ line, in addition to being input to the OR gates 118, 119 and 120, is input to the enable pin 15 of hex buffer 110. Pin 15 enables the buffer elements associated with pins 13 and 14 of buffer 110. The $\overline{\text{WRITE}}$ signal is inverted by inverter 114, pins 3 and 4, are then input to pin 14 of buffer 110. Output pin 13 of buffer 110 will act as a ground only when $\overline{\text{CAS}}$ is low (thus enabling pin 13) and WRITE is low. At all other times, pin 13 will be in either a tri-state or high status. The output at pin 13 of buffer 110 is connected to the enable pins 1 and 15 of buffer 111 and pin 15 of buffer 112 which enable output from the associated buffers in devices 111 and 112 for Dout 0 through Dout 7 only when the signal applied to these enable pins is low. Resistor 132 is a pull-up resistor which brings the Dout buffer enable line coming from pin 13 of buffer 110 to a high state except when, during a host computer read operation, pin 13 acts as a ground, placing enable pins 1 and 15 of buffer 111 and pin 15 of buffer 112 in a low state.

The purpose of the resistor capacitor network 134 is to, upon initially applying power, momentarily hold the clear input pin 1 of latch 116 low so that the memory expansion circuit would also be initialized with bank $\phi$ being the selected bank. The present invention anticipates that the host computer will provide appropriate DC voltages sufficient to power the PME circuit 100 via the I/O sockets 101–108, and that the memory extension will be implemented in a purely parasitic manner. Therefore, DC power supplies have not been shown in FIG. 4, but may if needed be provided from any convenient source.

The hex inverter 114 is operative to invert a number of signals distributed throughout the PME circuit 100. Hex inverter 114 inputs and inverts the following: $\overline{\text{OUT}} \rightarrow$OUT on pin 6; A6$\rightarrow \overline{\text{A6}}$ on pin 2; A2$\rightarrow \overline{\text{A2}}$ on pin 8; A1$\rightarrow \overline{\text{A1}}$ on pin 10; A0$\rightarrow \overline{\text{A0}}$ on pin 12; and $\overline{\text{WRITE}} \rightarrow$WRITE on pin 4. The first five of these inverted signals are applied to the five inputs of an 8-input NAND gate 115. These five are—OUT, $\overline{\text{A6}}$, $\overline{\text{A2}}$, $\overline{\text{A1}}$ and $\overline{\text{A0}}$. Applied to the other three inputs of NAND gate 115 are address signals A3, A4 and A5. The NAND gate 115 serves as the address decoder for the PME circuit 100, and its output on pin 8 goes to a logical low only when its associated host computer is writing to output port 56. This is derived by decoding via the NAND gate 115 of the signals OUT, $\overline{\text{A0}}$, $\overline{\text{A1}}$, $\overline{\text{A2}}$, A3, A4, A5 and $\overline{\text{A6}}$.

The output on pin 8 from NAND gate 115 is routed to the clock input on pin 9 of a 4-bit D latch 116. The 4-bit latch 116 has input data lines Din0–Din3, which the host computer outputs to port 56, applied to its four D inputs. The four bits stored in the 4-bit latch 116 are applied to the inputs of a 4-line-to-10-line decoder 117 which derives which of the ten separate memory banks B0–B9 is to be operational. Hereinafter for simplicity, this decoder will be referred to as the 4/10 decoder 117. The 4/10 decoder 117 produces an active low output on the particular one of its ten outputs which corresponds to the particular logic pattern applied to its four inputs. The ten outputs from the 4/10 decoder 117 are each individually OR'ed with the $\overline{\text{CAS}}$ signal in ten OR gates contained in three OR gates devices 118, 119 and 120. The OR gate devices are configured as quad 2-input positive OR gates. The particular output from the 4/10 decoder 117 exhibiting an active logic low produces an active logic low at the output of the corresponding OR gate upon occurrence of the $\overline{\text{CAS}}$ signal. The output of each of the ten OR gates in the gate devices 118–120 are routed to the $\overline{\text{CAS}}$ input of a particular one, and only that one, of the ten memory banks B0–B9.

As an example of the interconnections and functioning of representative paths of this portion of the circuitry, begin with the active low produced at pin 8 of the NAND gate 115 upon receipt and decoding of the host computer signal ordering a write to the output ports 56. Using, illustratively as before, 56 as the output port designation for the PME circuit 100, the software command, or its equivalent, for the host computer would be—

OUT 56,N where N is an integer between 0 and 9, and designates the particular bank to be addressed. The active low from pin 8 of NAND gate 115 is applied to the clock input on pin 9 of the 4-bit latch 116 whose four D inputs are then strobed into the latches as follows: Din0 from pin 2 of socket 101 is routed to input pin 2 of the 3-state hex bus driver 112 (always enabled), and thereafter via its corresponding output on pin 3 is applied to the 1D input on pin 4 of the 4-bit latch 116. Similarly, Din1 from pin 2 of socket 102 is routed to input pin 4 of the bus driver 112, and thereafter outputted on pin 5 and applied to the 2D input on pin 5 of the latch 116. Din2 from pin 2 of socket 103 is routed to input pin 6 of the buss driver 112, and thereafter outputted on pin 7, and applied to the 3D input on pin 12 of the latch 116; and Din3 from pin 2 of socket 104 is in like manner applied to the 4D input on pin 13 of the latch 116. The assertion outputs for the four data latches within latch device 116 are applied to the 4/10 decoder 117 as follows: The 1Q output on pin 2 of the latch 116 is routed to the "A" input on pin 15 of decoder 117; the 2Q output on pin 7 is routed to the "B" input on pin 14; the 3Q output on pin 10 is routed to the "C" input on pin 13; and the 4Q output on pin 15 is routed to the "D" input on pin 12.

Assuming the software command is—

OUT 56,4 the memory bank B4 receives the $\overline{\text{CAS}}$ signal as follows: The truth table for the 4/10 decoder 117 for output No. 4 is "A"=L, "B"=L, "C"=H, and "D"=L or "0100" in binary code. Thus, Din0 from socket 101 is low, Din1 from socket 102 is low, Din2 from socket 103 is high, and Din3 from socket 104 is low. This input data pattern therefore produces an active low output on pin 5 (the number 4 output) of the 4/10 decoder 117 which is routed to pin 13 of the OR gate 120. As previously described, the $\overline{CAS}$ signal originates from the host source applied to pin 15 on socket 102, and is made available throughout the PME circuit 100 via the output from hex buss driver 110 on its output pin 9. This $\overline{CAS}$ signal is applied to pin 12 of the OR gate 120 where it is OR'ed with the active low output signal from the 4/10 decoder 117 applied to pin 13. Thus, the positive dual OR gate having two active low levels on its input pins 12 and 13 produces an active low level at its output on pin 11. As shown, the output from pin 11 of OR gate 120 is applied to the $\overline{CAS}$ input of bank 4 (B4) thereby selecting the OR'ed memory bank. In like manner, the other nine outputs of the 4/10 decoder 117 are directed by the Din0–Din3 contents from sockets 101–104 to select the particular one of the banks B0–B9 desired.

Summarizing then, to write data into a particular bank of parasitic memory, four bits of data are first outputted by the host computer using an output instruction to select a particular memory bank from the available ten. Then a conventional write output operation is done using the full seven row and seven column addresses to select the appropriate one of the 16K possible address locations, and the output data from the host computer is read as Din into that location. Similarly, any or all of the ten banks B0–B9 may be loaded with data as desired from the host. To read data from a particular bank of the parasitic memory, the appropriate four bits of data is first outputted as part of a write output operation by the host and then a conventional read step is done again using the full row and column addresses to select the appropriate one of the 16K possible address locations. This retrieves the desired stored data for use in the host system.

It is not necessary, however, to fully populate the parasitic memory expansion circuit 100 with memory banks to the maximum capacity of the bank addressing scheme available from the host computer instructions. With obvious software restrictions, the above description would still apply if only, say, two banks of parasitic were utilized.

Although the present invention has been described with particularity relative to the foregoing detailed description of the preferred embodiment, various modifications, changes, additions and applications other than those specifically mentioned herein will be readily apparent to those having normal skill in the art without departing from the spirit and scope of this invention.

I claim:

1. In a digital computer having at least one addressable memory bank for storing data signals therein, each said addressable memory bank having multiple circuit connectors for address and control signals to store and retrieve said data signals including one of said multiple circuit connectors from which said addressable memory bank has been removed, the improvement comprising:
    (a) a memory expansion circuit including a plurality of expansion memory banks, said expansion memory banks electrically connected in parallel to one another and one of said expansion memory banks connected to said one of said multiple connectors from which said addressable memory bank has been removed, each said expansion memory bank corresponding to said addressable memory banks in said digital computer;
    (b) logic control means connected in parallel to said plurality of expansion memory banks and having first and second operating modes;
    (c) a plurality of input/output means interconnecting said plurality of expansion memory banks and said one multiple circuit connector for operationally connecting said address and control signals to said expansion memory banks;
    (d) said logic control means having digital decoder means responsive to a predetermined combination of said data, address and control signals to operate in said first operating mode and to select and make operational a particular one of said plurality of expansion memory banks in which information is to be stored; and
    (e) said logic control means operating in said second mode in the absence of said predetermined combination of signals to enable said data signals to be stored in and retrieved from said expansion memory bank selected by said digital decoder means to be operational in said first operational mode, said digital decoder means including an N-bit latch for inserting and storing said predetermined combination of said data signals when said logic control means is in said first operating mode, and for retaining said predetermined combination of said data signals when said logic control means is in said second operating mode.

2. In a digital computer according to claim 1, wherein said addressable memory banks and said expansion banks are defined by dynamic random access memory devices.

3. In a digital computer according to claim 1 wherein each of said expansion banks is connected in parallel to said computer via said one multiple circuit connector, and said data signals, address signals and control signals are all inputted via the pre-existing connections to said one multiple circuit connector, thereby implementing a totally parasitic memory expansion for said computer.

4. In a digital computer according to claim 1 wherein said digital decoder further comprises an N-line-to-M-line logic decoder connected to said N-bit latch for decoding said predetermined combination of data signals and for producing a selection signal for selecting and making operational said particular one of said expansion memory banks.

5. In a data processing unit having memory devices for storing data signals arranged in a plurality of addressable memory banks, each said addressable memory bank connectable to a multiple circuit connection for address and control signals to store and retrieve said data signals and having one multiple circuit connection from which one of said addressable memory banks has been removed, the combination therewith of a memory expansion circuit comprising:
    (a) a plurality of expansion memory banks each having a plurality of expansion memory devices arranged in a row, said rows of expansion memory devices electrically connected in parallel to one another and one row of said expansion memory devices connected to said one multiple circuit connection from which said one addressable memory bank has been removed, each said expansion bank corresponding to each said addressable memory bank in said digital computer;
    (b) logic control means connected to said plurality of expansion memory banks and having first and second operating modes;

(c) input/output means operationally connecting said multiple circuit connections of said one row of said addressable memory devices to said plurality of expansion memory banks and to said logic control means;

(d) said logic control means responsive to said address and control signals to said one row of addressable memory deviced to operate in said first mode to select and make operational a particular one of said plurality of expansion memory banks; and (e) said logic control means operating in said second mode in the absence of said predetermined combination of signals to enable said data signals to be stored in and retrieved from expansion memory bank selected by said digital decode means to be operational in said first operational mode, said digital decoder means including an N-bit latch for inserting and storing said predetermined combination of said data signals when said logic control means is in said first operating mode, and for retaining said predetermined combination of said data signals when said logic control means is in said second operating mode.

6. In a data processing unit according to claim 5, said logic control means operating in said second mode in the absence of said address and control signals to enable data signals to be stored in and retrieved from said selected expansion memory bank.

7. In a data processing unit according to claim 5, said input/output means having a digital decoder and a buffered input/output line connected to said data processing unit.

8. In the data processing unit of claim 5, wherein said memory expansion devices are dynamic random access memory devices.

9. In the data processing unit of claim 5, wherein each of said expansion memory banks is connected in parallel to said data processing unit via said one multiple circuit connection.

10. In the data processing unit of claim 5, said digital decoder comprises an N-bit latch for inserting and storing data signals when said logic control means is in said first operating mode, and for retaining said data signals when said logic control means is in said second operating mode.

11. In the data processing unit of claim 10, said digital decoder having an N-line-to-M-line logic decoder connected to said N-bit latch for decoding selected data signals and for producing a selection signal for selecting and making operational a selected one of said expansion memory banks.

* * * * *

UNITED STATES PATENT AND TRADEMARK OFFICE
CERTIFICATE OF CORRECTION

PATENT NO. : 4,473,877
DATED : September 25, 1984
INVENTOR(S) : Ronald K. Tulk

It is certified that error appears in the above—identified patent and that said Letters Patent is hereby corrected as shown below:

Column 3, line 3, cancel "foregoing" and substitute -- following --.
Column 9, line 25, cancel "are" and substitute -- and --.

In the Claims:

Column 12, line 20 (Claim 1), cancel "decoder" and substitute -- decode --.

Column 13, line 8 (Claim 5), cancel "deviced" and substitute -- devices --.

Signed and Sealed this

Eighteenth Day of June 1985

[SEAL]

Attest:

DONALD J. QUIGG

Attesting Officer    Acting Commissioner of Patents and Trademarks